(12) United States Patent
Thomas et al.

(10) Patent No.: US 10,437,580 B2
(45) Date of Patent: Oct. 8, 2019

(54) SOFTWARE UPDATING METHODS AND SYSTEMS

(71) Applicant: Apple Inc., Cupertino, CA (US)

(72) Inventors: Edward E. Thomas, Cupertino, CA (US); Eric S. Brown, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/906,305

(22) Filed: Feb. 27, 2018

(65) Prior Publication Data

US 2019/0079746 A1 Mar. 14, 2019

Related U.S. Application Data

(60) Provisional application No. 62/557,039, filed on Sep. 11, 2017.

(51) Int. Cl.
*G06F 8/65* (2018.01)
*G06F 21/57* (2013.01)
*G06F 8/61* (2018.01)
*G06F 9/4401* (2018.01)

(52) U.S. Cl.
CPC ............. *G06F 8/65* (2013.01); *G06F 8/61* (2013.01); *G06F 21/572* (2013.01); *G06F 21/575* (2013.01); *G06F 9/4401* (2013.01); *G06F 9/4406* (2013.01); *G06F 2221/033* (2013.01)

(58) Field of Classification Search
CPC ..................................... G06F 8/65; G06F 8/61
USPC .................................................. 717/168, 174
See application file for complete search history.

(56) References Cited

U.S. PATENT DOCUMENTS

| 8,341,384 | B2  | 12/2012 | Matthew et al. |
| 8,561,058 | B2* | 10/2013 | Laska ................. G06F 11/3664 717/172 |
| 8,752,977 | B2* | 6/2014  | Popper ...................... F21L 4/04 362/187 |
| 9,378,007 | B2  | 6/2016  | Matthew et al. |
| 2004/0019823 | A1 | 1/2004 | Gere |
| 2004/0153724 | A1 | 8/2004 | Nicholson et al. |
| 2004/0221024 | A1* | 11/2004 | Yamada .................... G06F 8/65 709/222 |

(Continued)

FOREIGN PATENT DOCUMENTS

| WO | WO2016164253 A1 | 10/2016 |
| WO | WO2016187529 A1 | 11/2016 |

*Primary Examiner* — Phillip H Nguyen
(74) *Attorney, Agent, or Firm* — Womble Bond Dickinson (US) LLP

(57) ABSTRACT

Installation of an operating system update on a data processing system can begin by receiving one or more packages containing an operating system (OS) update that includes a first portion of the OS update and a second portion of the OS update. The first portion, once installed, provides a bootable OS which allows other applications to execute on the OS even without the second portion being installed. After the first portion has been installed, the installation process (e.g., an installer) commits the data processing system to boot off the first portion. After committing to boot off the first portion, the data processing system cannot boot off the prior OS. After the committing, the data processing system attempts installation of the second portion, and this attempt occurs automatically in response to successful installation of the first portion.

22 Claims, 7 Drawing Sheets

(56) References Cited

U.S. PATENT DOCUMENTS

| | | | |
|---|---|---|---|
| 2005/0144651 A1* | 6/2005 | Prus | G06F 8/64 |
| | | | 725/134 |
| 2005/0235281 A1* | 10/2005 | Lefrancois | G06F 8/60 |
| | | | 717/175 |
| 2010/0318812 A1 | 12/2010 | Auradkar et al. | |
| 2012/0154126 A1* | 6/2012 | Cohn | H04L 12/2827 |
| | | | 340/10.51 |
| 2013/0111466 A1* | 5/2013 | Matthew | G06F 8/60 |
| | | | 717/175 |
| 2013/0279690 A1 | 10/2013 | Durham et al. | |
| 2013/0283027 A1* | 10/2013 | Brooks | G06F 9/00 |
| | | | 713/2 |
| 2014/0136826 A1* | 5/2014 | Paek | G06F 9/4401 |
| | | | 713/1 |
| 2014/0245025 A1 | 8/2014 | Fairless | |
| 2014/0298319 A1* | 10/2014 | Huang | G06F 8/61 |
| | | | 717/174 |
| 2014/0325498 A1* | 10/2014 | Sirois | G06F 8/65 |
| | | | 717/170 |
| 2016/0057001 A1 | 2/2016 | Cartes et al. | |

* cited by examiner

SOFTWARE UPDATING METHODS AND SYSTEMS

This application claims the benefit of U.S. Provisional Patent Application No. 62/557,039 filed on Sep. 11, 2017, which is incorporated herein by reference in its entirety.

BACKGROUND

This description relates to techniques to update software and particularly relates to techniques to update operating system software for data processing systems such as computers and smart phones.

The process of updating operating system (OS) software typically involves a series of operations that include: receiving an OS update package that includes a set of files containing new or modified software; unpacking (e.g., decompressing) the OS update package; rebooting the data processing system into an update mode in which installation software installs the OS update; and rebooting the data processing system to load and run the updated OS. During this series of operations, at some point, the data processing system enters a state in which the prior operating system cannot be used to boot the data processing system and the updated OS has not completed its installation so the data processing system cannot boot from the updated OS. In this state, if the installation of the updated OS fails to be completed (e.g., the device loses power) the data processing system cannot boot up on its own and must be coupled to another data processing system to reinstall a bootable operating system through a process known as recovery mode.

SUMMARY OF THE DESCRIPTION

The embodiments described herein relate to installation of software such as an operating system update. In one embodiment, a method for performing installation of software can include the following operations: receiving a set of one or more packages containing an operating system update which includes a first portion of the operating system update and a second portion of the operating system update; installing the first portion which provides a bootable operating system without the second portion being installed; committing to boot off the first portion after installing the first portion; and attempting installation, after committing to boot off the first portion, of the second portion, wherein installation of the second portion is attempted automatically in response to successful installation of the first portion. In one embodiment, the committing to boot off the first portion requires the data processing system that is performing the installation to boot off the first portion rather than a prior operating system. In one embodiment, the first portion provides only some of the functionality of the operating system update, and the second portion provides a remainder of the functionality of the operating system update and both of the first and second portions are described in or referred to in a manifest that lists the contents of the operating system update. In one embodiment, the method can further include: confirming proper installation of the first portion prior to committing to boot off the first portion. In one embodiment, if installation of the second portion fails, the first portion can operate with a second portion of a prior operating system.

In one embodiment, the installation of the first portion can include installing new boot software while retaining the prior boot software to allow reversion to the prior boot software before a point of no return. In one embodiment, installation of the first portion can also include installing a new operating system software through a copy on write snapshot while the prior operating system software remains available for use in booting up the data processing system prior to the point of no return. In one embodiment, the committing to boot off the first portion commits the data processing system to boot off the first portion by switching a boot up parameter to indicate to boot off the new boot software rather than the prior boot software. In one embodiment, the installation of the first portion can also include the installation of a disk operating system or storage controller software for a non-volatile memory, such as a NAND flash memory; in one embodiment, the disk operating system can be backward-compatible with a prior operating system software (so that, if the system needs to revert back to the prior OS software, it can still use the new disk operating system or storage controller software).

In one embodiment, the operating system update is installed on an embedded system that provides secure boot up for a main data processing system that contains the embedded system, and the embedded system can include a secure processing system. In one embodiment, the embedded system can store and verify a boot program to boot up the main data processing system. In one embodiment, a failure to install the second portion can cause the data processing system to redo the update of the second portion. In one embodiment, the second portion can include updated firmware for a set of one or more sensors, including a radio for wireless payment. In one embodiment, the committing to boot off the first portion can change a cryptographic parameter related to a code signature so that a prior operating system will have an invalid code signature and not be allowed to boot by the secure processing system.

In one embodiment, the first portion, once installed, provides a bootable operating system which allows other applications to execute on the operating system even without the second portion being installed. In one embodiment, the second portion of the operating system update is installed automatically by the system and is not an optional component of the operating system update. In one embodiment, no user input is required in selecting or un-selecting the second portion during an installation process because, in one embodiment, the installation of the second portion is performed automatically after the first portion is successfully installed and in response to the first portion being successfully installed.

The methods and systems described herein can be implemented by data processing systems, such as smart phones, tablet computers, desktop computers, laptop computers, server systems, and other data processing systems, and other consumer electronic devices. The methods and systems described herein can also be implemented by one or more data processing systems which execute executable computer program instructions, stored on one or more non-transitory machine readable media that cause the one or more data processing systems to perform the one or more methods described herein when the computer program instructions are executed. Thus the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can improve the process of installing new software such as an operating system update by reducing the probability of being forced into recovery mode when installation of the operating system update reaches a point at which the prior operating system cannot be used to boot the data processing system and the new operating system also cannot be used to boot the data processing system. In this circumstance, the data processing system is forced to be used in a recovery mode, which often requires the data processing system to be connected to another data processing system which acts as a host to allow installation of a bootable operating system through the recovery mode. In one embodiment, the possibility of the need for recovery mode can be reduced by minimizing operations which occur after a point of no return in which the prior operating system cannot be used and prior to another point in the process in which a remainder of the operating system update can be installed. The latter point in the process can be referred to as a fail forward point, and after the fail forward point, the data processing system can boot up with at least a portion of the operating system update even if a remaining portion of the operating system update was not successfully installed.

Figure 1:
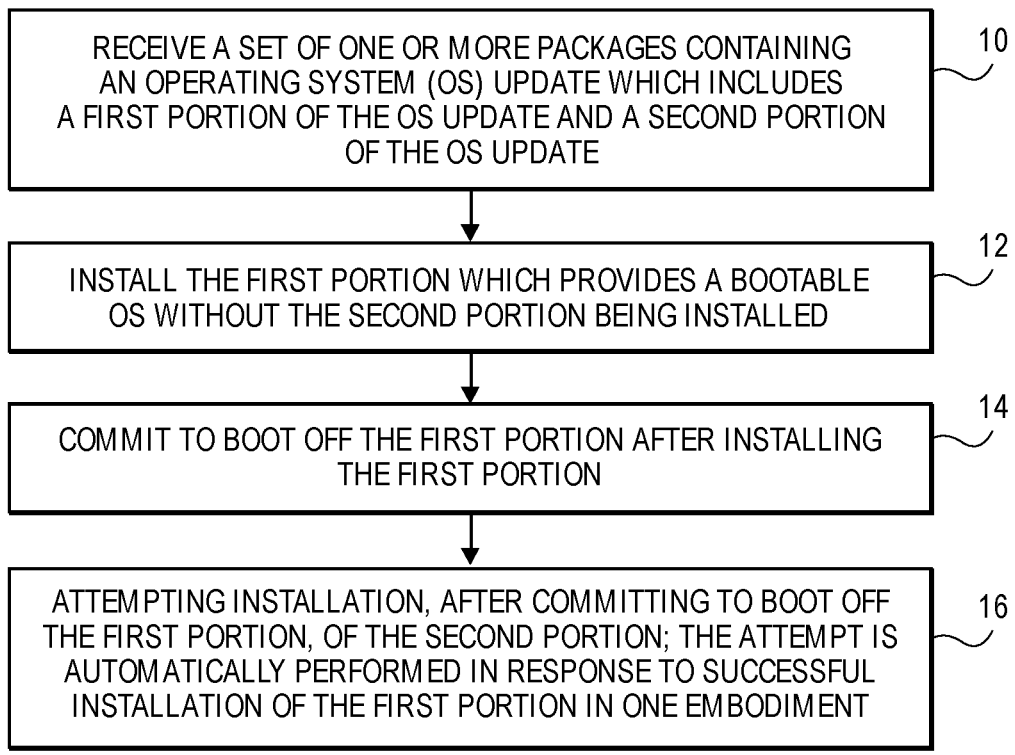
FIG. 1 is a flowchart which illustrates a method according to one or more embodiments described herein.

Referring now to FIG. 1, a method is shown according to one or more embodiments for performing the installation of an operating system update. An operating system update can be either a minor modification to the operating system or a major modification of the operating system or even an entirely new operating system in one embodiment. The method shown in FIG. 1 can begin in operation 10 in which a set of one or more packages can be received by a data processing system which is to perform the installation of software contained in the one or more packages. In one embodiment, the one or more packages contain an operating system update which includes a first portion of the operating system update and a second portion of the operating system update. In one embodiment, each portion, such as the first portion and the second portion, can include multiple components or multiple separate files, and in one embodiment, the second portion can be one of several portions that are installed after the first portion is installed and committed to boot off of In operation 12, the data processing system installs the first portion which can provide in one embodiment a bootable operating system without the second portion being installed. Thus, even though the first portion and the second portion are both part of the same operating system update (and can be listed in and described in a manifest for the OS update), the first portion provides sufficient functionality and bootability such that the first portion can boot successfully the data processing system. In one embodiment, the first portion provides a bootable operating system because it can be loaded and then executed and then initializes the system to allow other application programs to run on the operating system and to allow, in one embodiment, basic input and output operations to be performed with the data processing system. In one embodiment, booting the data processing system without the second portion being installed can limit the functionality of the data processing system due to the fact that the second portion provides functionality not provided by the first portion, such as functionality relating to sensors, input/output devices, etc. After operation 12 completes the installation of the second portion, in operation 14, the data processing system commits to boot off the first portion after installing the first portion. In one embodiment, after committing to boot off the first portion in operation 14, the data processing system has reached a point of no return because the data processing system cannot boot off the prior operating system which itself may contain a second portion of the prior operating system which was not required to be installed to create a bootable system. After operation 14, the data processing system attempts installation in operation 16 of the second portion after having committed to booting off of the first portion. In one embodiment, the attempt to install the second portion is automatically performed in response to a successful installation of the first portion, and this automatic performance occurs without any user action being required or any user intervention being needed in one embodiment. In one embodiment, the second portion of the operating system update is not an optional portion of the operating system update but rather part of the normal functionality of the operating system update. In one embodiment, the second portion can provide functionality relating to sensors or input/output devices, etc. In one embodiment, if the installation of the second portion fails, the operating system created by the operating system update which was installed as part of the method shown in FIG. 1 can utilize a prior version of the second portion from a prior operating system or can attempt to repeat the installation process for the second portion. In one embodiment, if this installation of the second portion fails, the operating system update can provide all of the functionality of the first portion but cannot provide the functionality provided by the second portion which was part of the operating system update.

Figure 4:
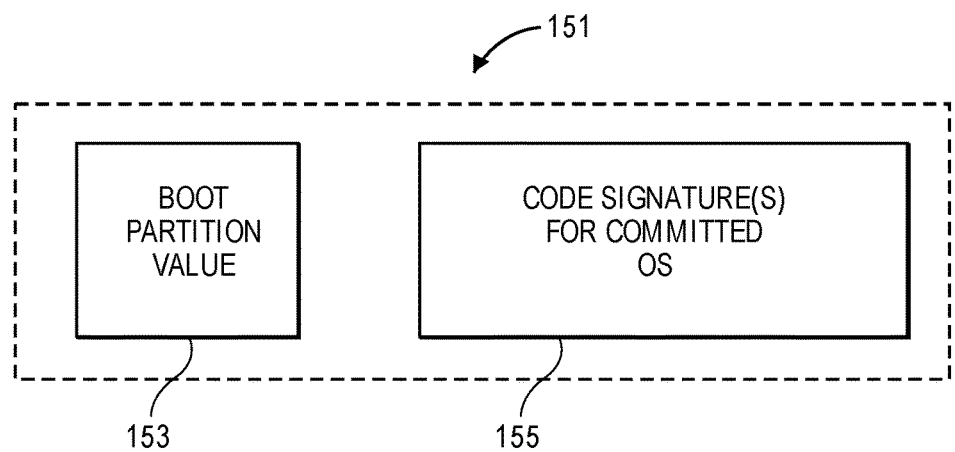
FIG. 4 shows an example of two data structures which can be used in the one or more installation methods described herein.

In one embodiment, operation 14 commits the data processing system to boot off the first portion rather than a prior operating system by designating new boot software to be used in the boot up process, which designation may be a boot partition value shown in data structure 153 in FIG. 4. Also, committing to boot off the first portion may include a selection of or designation of the correct or valid code signature or set of code signatures for the committed operating system which is used during the boot up process to authenticate and validate operating system software so that it can be considered trusted software. In one embodiment, prior to performing operation 14, the data processing system can confirm the proper installation of the first portion by using techniques known in the art, such as the use of checksums or hashes or other techniques which confirm that the software of the first portion was correctly written and stored to a non-volatile storage device. In one embodiment, the installation of the first portion in operation 12 can include installing new boot software while retaining the prior boot software to allow reversion to the prior boot software prior to the point of no return. Moreover, the installation of the first portion can also include installing new operating system software through a copy-on-write snapshot while the prior operating system software remains available for use in booting up the data processing system prior to the point of no return in one embodiment. In one embodiment, the method shown in FIG. 1 can be used on a data processing system which does not include an embedded system while in another embodiment, the method shown in FIG. 1 can be used on a data processing system which can be considered a main data processing system which happens to include an embedded data processing system (and the OS update is installed on the embedded data processing system).

Figure 2A:
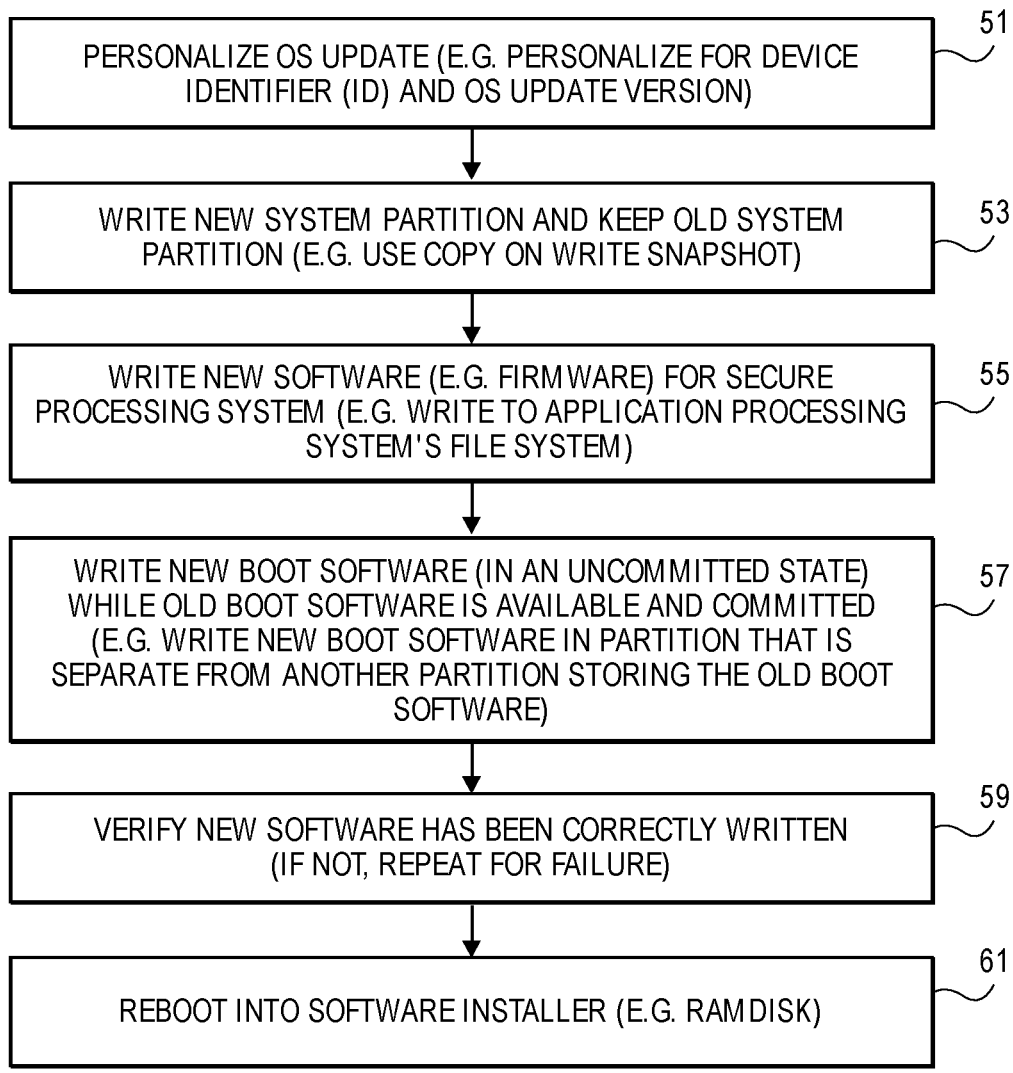
FIG. 2A is a flowchart which illustrates a method according to one or more embodiments described herein.
Figure 2B:
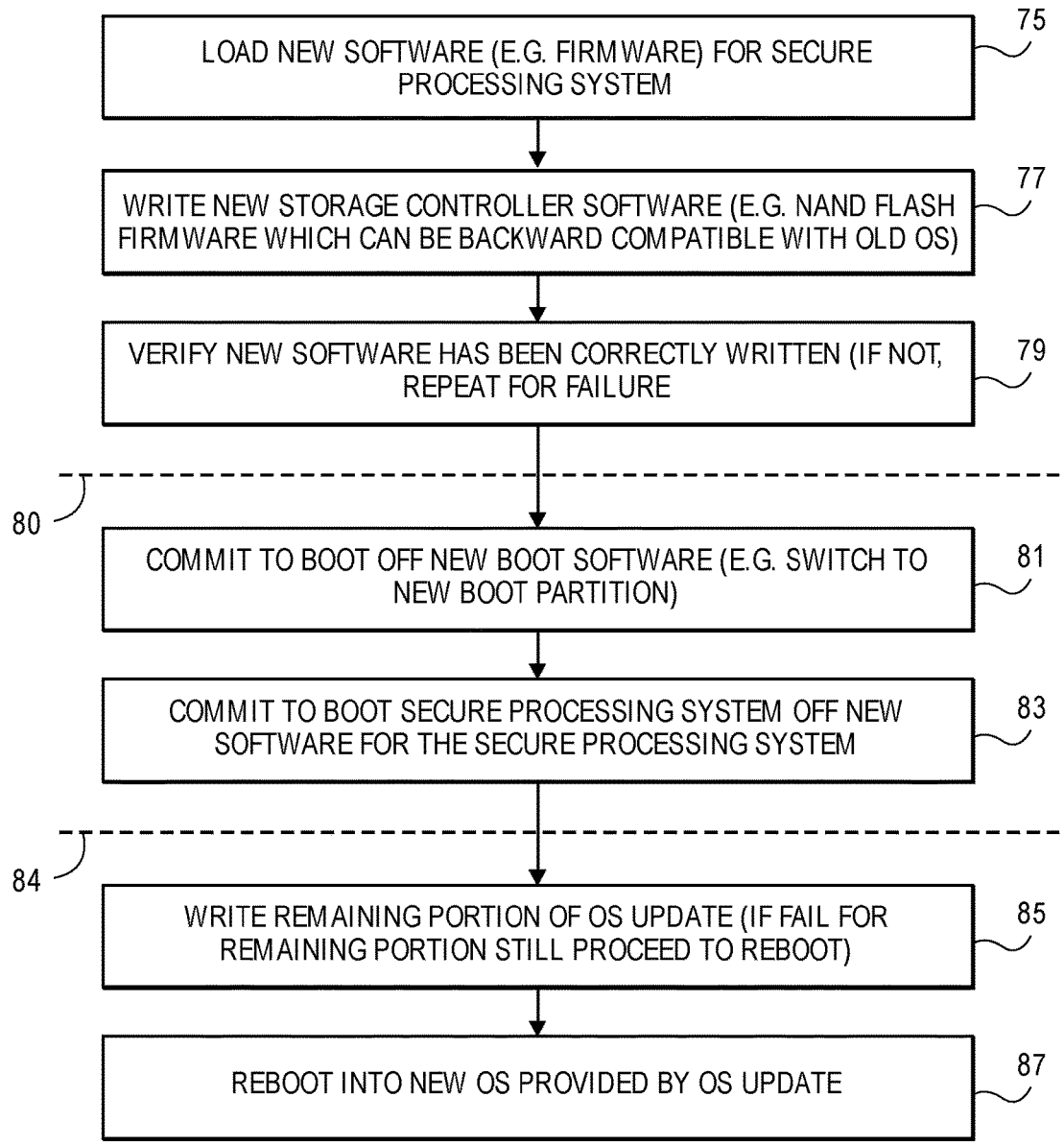
FIG. 2B is a flowchart which shows a method according to one or more embodiments described herein.

FIGS. 2A and 2B show a more detailed example of a method for installing an operating system update according to one or more embodiments described herein. The method in FIG. 2A can begin with the receipt of one or more packages containing an operating system update which includes at least two portions, where at least certain of those portions can be used to create a bootable operating system without the remainder of the portions. These packages can be received and decompressed prior to operation 51 shown in FIG. 2A. In operation 51, the data processing system can optionally personalize the operating system update in one embodiment, and this can involve personalizing a code signature using a device identifier of the device and also optionally using a version identifier of the operating system update. The personalization operation 51 can in one embodiment restrict operation of the operating system update to a particular device specified by the device identifier which can be stored in a secure processing system such as the secure processing system shown in FIG. 7. In operation 53, the data processing system can write new operating system software in a new system partition or volume and can keep the old system partition or volume so that the data processing system has the flexibility of reverting back (prior to the point of no return) to the use of the old operating system in the old operating system partition or volume. In one embodiment, a copy-on-write snapshot technique can be used to write the new system partition while keeping the old system partition available for use. An example of such a technique is described in U.S. patent application Ser. No. 15/275,099, filed Sep. 23, 2016, and entitled "Performing Live Updates to File System Volumes" by inventors Eric B. Tamura and Eric S. Brown. This US patent application is hereby incorporated herein by reference. In one embodiment, operation 53 can create a new system partition and then store the new operating system in that partition or alternatively create a new volume and store the new operating system software in the new volume. In another embodiment, the copy-on-write snapshot technique can be used without separate partitions or without separate volumes.

Figure 3:
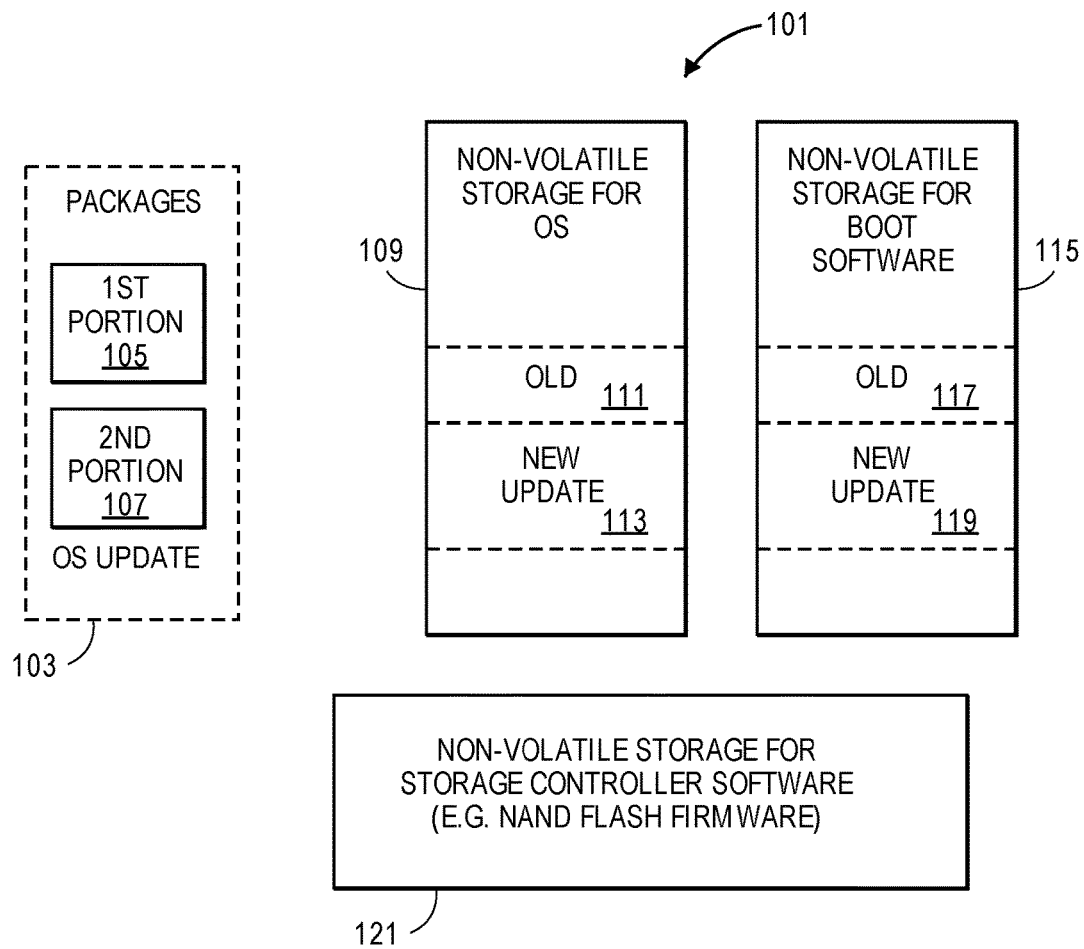
FIG. 3 shows an example of a storage architecture which can be used in the installation methods described herein.
Figure 7:
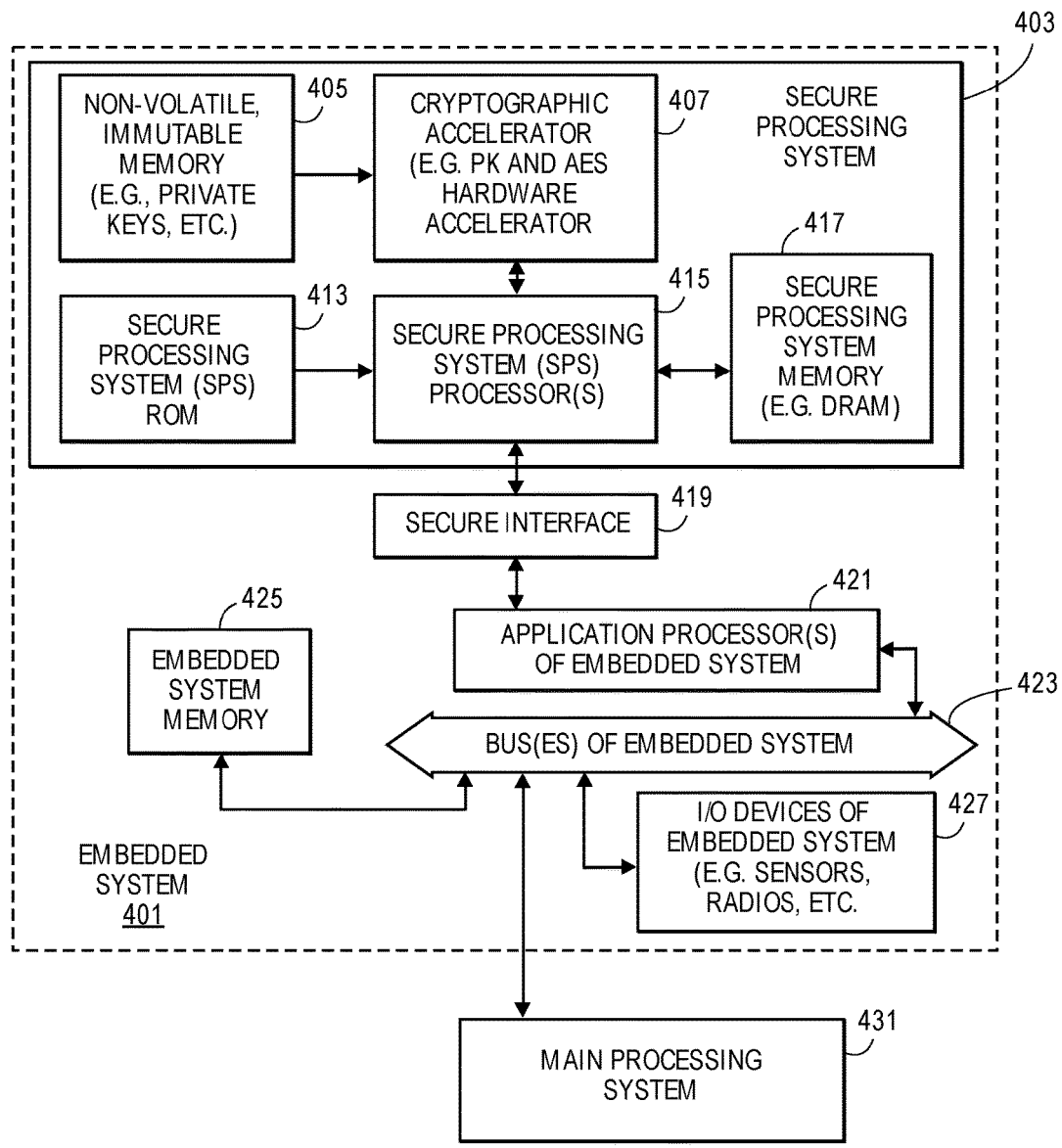
FIG. 7 shows an example of a data processing system which includes a main processing system and an embedded data processing system that can be used to provide security and other functionality for the main processing system.

In operation 55, the data processing system can write new software, such as firmware, for a secure processing system. In one embodiment, the data processing system can write the new software for the secure processing system into a file system maintained by an application processing system which is coupled to the secure processing system. FIG. 7 shows an example of a secure processing system which is coupled to one or more application processors of an embedded system. The new firmware in operation 55 can in one embodiment be firmware which executes on a secure processing system to authenticate users and validate software through code signatures and perform other security functions, etc. In operation 57, the data processing system can write new boot software while the old boot software is available and committed for use in booting the data processing system. In one embodiment, the new boot software can be written into a partition in a non-volatile storage device that is separate from another partition in the non-volatile storage device which stores the old boot software. FIG. 3 shows an example of a non-volatile storage 115 for storing boot software for both old and new boot software in separate partitions, such as partition 117 for the old boot software and partition 119 for the new boot software. Then in operation 59, the data processing system can verify that the new software has been written correctly using techniques known in the art, such as checksums, hashes of the software, etc. to verify that the stored version of the new software has been correctly written and stored on a non-volatile storage device. If operation 59 determines that the software has not been correctly written then for that portion of the software which has incorrectly been written, the software can be written again by repeating the process for writing the particular software which appears to have errors. It will be appreciated that operations 53, 55, and 57 can be performed in a different order than shown in FIG. 2A; for example, operation 57 may proceed operation 53 in one embodiment, etc. It will also be appreciated that the installation process shown in FIG. 2A is performed after the data processing system has booted from the old operating system and while it is executing under the old operating system. In operation 61, the data processing system is rebooted into a software installer, such as a software installer in an image in RAM disk of the data processing system in one embodiment. Operation 61 is normally performed, in one embodiment, only after successful verification in operation 59.

Figure 5:
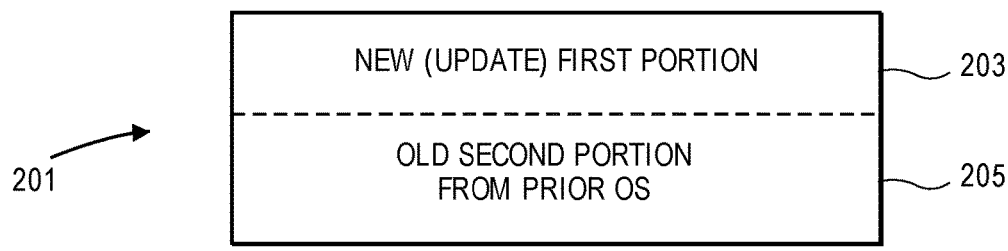
FIG. 5 shows an example of a representation of the state of an operating system on a data processing system when the attempted installation of the second portion from an operating system update fails in one embodiment which may not use code signing for the second portion.

After the data processing system reboots into the software installer operating system, the method shown in FIG. 2B can begin in one embodiment. In operation 75, the data processing system loads the new software for the secure processing system. In one embodiment, the new software written as part of operation 55 shown in FIG. 2A is written or loaded into memory of the secure processing system in operation 75 so that the secure processing system can run the new software for the secure processing system. For example, the new software for the secure processing system can be loaded into secure processing system memory 417 shown in FIG. 7 to allow the secure processing system's processor or processors to execute the new software for the secure processing system. Referring back to FIG. 2B, in operation 77, the data processing system can write new storage controller software to be executed by a storage controller, such as NAND flash firmware which controls flash memory. In one embodiment, this storage controller software can be backward-compatible with the old operating system so that, should the installation be abruptly terminated, such as power is lost, the old operating system can work with the new storage controller software because it is backward-compatible with the old operating system. Then in operation 79, the data processing system can once again verify that the new software has been correctly written using techniques known in the art, such as checksums, hashes of the software that has been stored, etc. If the software has not been correctly written, then the process can be repeated for the particular software component or module which appears to have an error as determined by the verification process. If the new software has been verified to have been correctly written, then operation 81 can be performed in which the data processing system commits to boot off the new boot software. For example, in one embodiment, the data processing system can commit to the new boot software by switching a value (e.g., a value stored in data structure 153 shown in FIG. 4) to indicate that the active partition to boot off of is the new partition, such as new partition 119 shown in FIG. 3. After operation 81 has been performed, the data processing system has reached a point of no return because it has committed to boot off the new boot software. The dashed line 80 in FIG. 2B represents the point of no return. In one embodiment, the new boot software can be part of a chain of trust (beginning with the ROM 413) enforced by the secure processing system such that only validly authenticated software which is part of the operating system update will be allowed to execute, and hence the prior operating system will not be allowed to execute. FIG. 4 shows an example of how data structures can be used as part of the commit operation to enforce the use of code signatures for only the new operating system and to enforce the chain of trust which in one embodiment can begin with a read only memory (ROM) in the secure processing system. As shown in FIG. 4, the data structure 153 can store a value which indicates the currently committed boot partition for the boot software in storage 151. Similarly, data structure 155 can indicate the set of one or more valid code signatures for the currently committed operating system. In one embodiment, the storage 151 can be stored in non-volatile memory of a secure processing system, such as the secure processing system 403 shown in FIG. 7 or can be stored in memory used by one or more application processors of a main processing system or of an embedded system which is contained within a main processing system. Referring back to FIG. 2B, in operation 83, the data processing system can commit to boot the secure processing system off the new software for the secure processing system. In one embodiment, this can be performed by using the data structure 155 shown in FIG. 4 to indicate the valid code signatures for the committed operating system such that the prior operating system will no longer be considered trusted or valid software and thus will not be allowed to execute. After operation 83 is successfully performed, at that point the data processing system can be considered to be in a state which may be referred to as a fail forward state in which subsequent installation processes will not cause a recovery mode but rather will cause the data processing system to use, in one embodiment, at least a portion of the operating system update while a remaining portion is not used. In one embodiment, this means that the data processing system boots from the new operating system which has reduced functionality because a remaining portion of that operating system update has not been successfully installed. The dashed line 84 represents the fail forward point. In operation 85 of FIG. 2B, the data processing system attempts to write the remaining portion of the operating system update software. In one embodiment, this attempt to install the remaining portion of the operating system update occurs automatically in response to successfully completing the installation of the bootable portion of the operating system update, which in the embodiment shown in FIG. 2B includes the commit operations 81 and 83. In one embodiment, the writing of the remaining portion in operation 85 is performed without requiring user input, and the remaining portion is non-optional and provides some functionality of the operating system update that is not provided by the bootable portion of the operating system update which was installed prior to operation 85. In one embodiment, the remaining portion of the operating system update can include firmware for sensors, and input/output devices, such as one or more radios. In one embodiment, the radios can include a radio for wireless payment, such as Apple Pay. If the writing of the remaining portion fails such that the installation of the remaining portion of the operating system update is not successful, the data processing system can still boot off of the portion of the operating system update which was installed prior to operation 85. In one embodiment, the result of booting of the data processing system from the bootable portion without the successful completion of operation 85 is shown in FIG. 5 which represents what may be referred to as a fail forward operating system which is a hybrid operating system 201 which includes a portion of the operating system update which was successfully installed, which can be referred to as the first portion 203. In addition, the fail forward operating system can include the second portion from the old or prior operating system which had previously been successfully installed and is shown as portion 205, in one embodiment in which code signing or authentication is not used (or is relaxed) for the second portion. The fail forward operating system may provide reduced functionality because the old second portion 205 may not have all the functionality of the remaining portion of the new operating system. However, the fail forward operating system may still provide for the ability to boot the operating system for the data processing system and thereby avoid recovery mode and allow the data processing system to recover itself without requiring another data processing system for assistance. Referring back to FIG. 2B, it can be seen that in operation 85, failure to install the remaining portion of the operating system update will still allow the data processing system to proceed to a reboot in operation 87 in which the data processing system reboots into the new operating system.

FIG. 3 shows an example of a storage architecture 101 which can be used with the method shown in FIGS. 2A and 2B. Storage architecture 101 includes packages 103, non-volatile storage 109, non-volatile storage 115, and non-volatile storage 121. The one or more packages 103 contain the operating system update which can be received by the data processing system during the initial stages of an installation process. The one or more packages 103 can include a first portion 105 and a second portion 107. In one embodiment, the first portion 105 corresponds to the bootable portion of the operating system update while the second portion 107 corresponds to the remaining portion of the operating system update, such as the remaining portion referred to in operation 85. The non-volatile storage 109 can be storage for the operating system software components and can include one or more partitions or one or more volumes for storing the old and the new operating systems. In one embodiment, a copy-on-write snapshot technique can be used to store the old and the new operating systems without requiring different partitions or different volumes. In the example shown in FIG. 3, the old operating system software is stored in storage 111 within the non-volatile storage 109 and the new operating system update is stored in storage 113. In one embodiment, operation 53 shown in FIG. 2A can write software from first portion 105 into the new update storage 113. In one embodiment, the data processing system in operation 57 of FIG. 2A can write software from first portion 105 shown in FIG. 3 to the partition 119 shown in FIG. 3. In one embodiment, the data processing system performing operation 77 shown in FIG. 2B can write software from the first portion 105 shown in FIG. 3 to the non-volatile storage 121 which is non-volatile storage for a storage controller, such as a NAND flash storage controller. The data processing system which is performing the installation operations can in operation 85 write portion 107 to the storage 113 to complete the installation process of the operating system update. It will be appreciated that the storage architecture 101 allows the data processing system to be tolerant of failures because the old operating system and the old boot software is maintained as available for use prior to the point of no return (e.g., after completing operation 81 in FIG. 2B) should the update fail, such as the device loses power during the software installation process.

Figure 6:
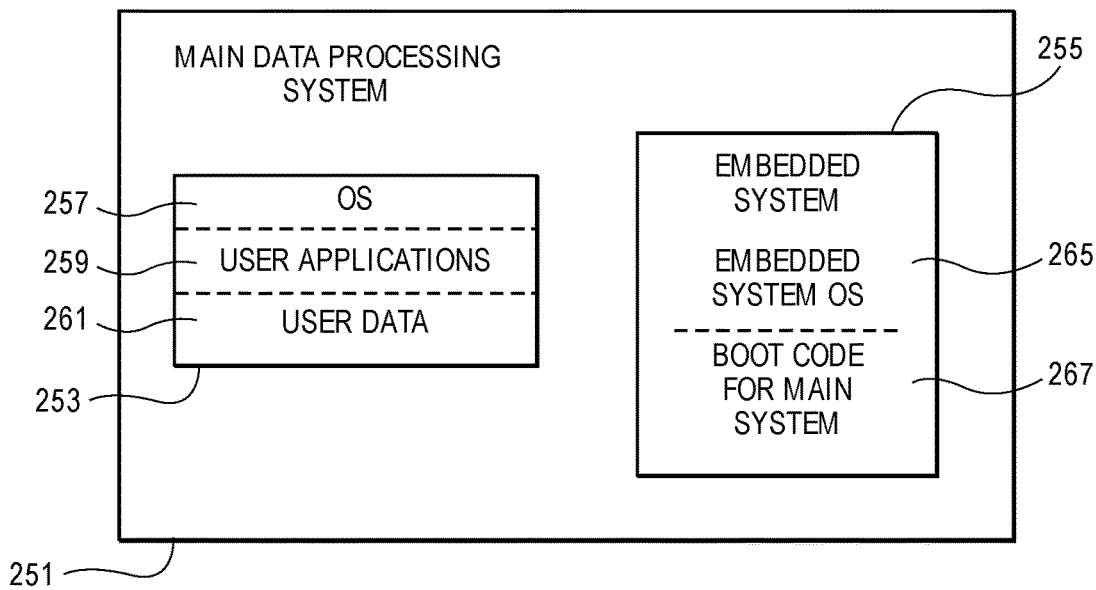
FIG. 6 shows an example of the storage of software and user data and user applications on a data processing system which includes a main data processing portion and an embedded system.

The methods described herein can be performed with data processing systems which do not include embedded systems or do not include secure processing systems. For example, the data processing system shown in FIG. 8 can be used with the method shown in FIG. 1 and can be used without an embedded system and without a secure processing system. In another embodiment, the method shown in FIGS. 2A and 2B can be performed with a data processing system which includes one or more application processors and also includes a secure processing system. Moreover, in another embodiment, the method shown in FIGS. 2A and 2B can be performed in a data processing system which includes both the main processing system as well as an embedded system, and the embedded system may include a secure processing system, such as the secure processing system 403 shown in FIG. 7. Referring now to FIG. 6, a main data processing system includes software for both the main data processing system as well as software for the embedded system. FIG. 6 shows the software storage 251 on the entire system. The main data processing system includes an operating system 257, one or more user application programs 259 and user data 261 as part of storage maintained by the main data processing system. In one embodiment, the main data processing system includes one or more application processors that execute the user applications 259 which can use the user data 261 and can be stored as part of a file system 253 maintained by file system software that is part of the main data processing system. The main data processing system includes within it an embedded system 255, and this embedded system uses an embedded system operating system 265 to boot the embedded system. In one embodiment, the embedded system 255 can include a secure processing system which can validate as trusted code the boot code 267 which is used to boot the main data processing system, which in turn boots the operating system 257. In one embodiment, the method of FIG. 1 or the method of FIGS. 2A and 2B can be performed to install an OS update on the embedded system's operating system 256.

FIG. 7 shows an example of a data processing system which includes a main processing system 431 and an embedded processing system 401 which also includes the secure processing system 403. In one embodiment, the main processing system 431 can be the processing system of a laptop computer, and the embedded system 401 can be the processing system of a smart phone, and within the embedded system, there is a secure processing system which can be used to authenticate users, validate software for execution to verify the software before it is allowed to execute, and perform other security functions, etc. The main processing system 431 can be similar to the system shown in FIG. 8 and can be coupled to the embedded system 401 through one or more interconnects which couple buses, such as one or more buses of the main processing system to one or more buses 423 of the embedded system. In one embodiment, the embedded system can store the boot software of the main processing system 431 and can validate as trusted the boot software of the main processing system 431 before the boot software of the main processing system 431 is allowed to execute on the main processing system 431. In one embodiment, the validation of the boot software for the main processing system 431 can be performed by the secure processing system 403 which includes a secure processing system processor or set of processors 415, and a secure processing system ROM 413 which is coupled to the secure processing system processor(s) 415. Secure processing system memory, such as DRAM and/or flash memory is coupled to the secure processing system processor(s) 415, and the secure processing system memory 417 can store executable program instructions which execute on the secure processing system processor 415 as well as storing data for use in secure processing operations to provide cryptographic operations or security functions. The secure processing system ROM 413 can be used to boot the secure processing system processor 415 in a trusted manner, which can be the beginning of the chain of trust that the secure processing system processor 415 uses to validate the remainder of the operating system software, beginning with the firmware of the secure processing system 403 and continuing with the OS of the embedded system and the boot software of the main processing system 431. In one embodiment, the secure processing system 403 validates code signatures for each subsequent software that is to be executed before it is allowed to be executed by checking, for example, a code signature of the software and verifying that the code signature indicates the software is valid and has not been corrupted and hence can be trusted. In one embodiment, the secure processing system 403 can also include a cryptographic accelerator 407 which is coupled to a non-volatile, immutable memory 405 which can store device keys, private keys, one or more certificates, etc. which are hidden from the rest of the system and which are not readable by the rest of the system in one embodiment. Hence, the non-volatile, immutable memory 405 stores in a secure manner private keys, device identifiers, certificates, etc. which cannot be revealed to the rest of the system during normal use of the system. In one embodiment, the cryptographic accelerator 407 has access to the private keys and other data within the memory 405 and access to the memory 405 is not allowed for components outside of the secure processing system 403. The lack of access to memory 405 is one reason why the secure processing system 403 can be considered "secure." In one embodiment, the secure processing system 403 can be coupled to one or more application processors 421 of the embedded system through a secure interface 419 which in one embodiment can be an in-box and an out-box that allows the secure communication channel between the application processors 421 and the secure processing system 403. An example of a secure processing system, such as the secure processing system 403 is described in published US patent publication number US2014/0089682, which published US patent publication is incorporated herein by reference. The one or more application processors 421 can be coupled to one or more buses 423 which are coupled to one or more input and output devices, such as sensors, radios, etc. In one embodiment, the radio can be a near field communication radio which is used for wireless payment. The examples of the input and output devices 427 depend upon device and can include other or different input or output devices. The embedded system memory 425 can include read-only memory as well as flash memory and DRAM memory for storing application programs for execution by the one or more application processors 421. In one embodiment, the secure processing system 403 and the embedded system 401 can be implemented as a system-on-a-chip containing all the components shown within embedded system 401 in FIG. 7, and the main processing system 431 can be implemented on a printed circuit board with numerous integrated circuits and buses.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, desktop computers, laptop computers, tablet computers, smart phones, cellular telephones, personal digital assistants (PDAs), embedded electronic devices, or other consumer electronic devices.

Figure 8:
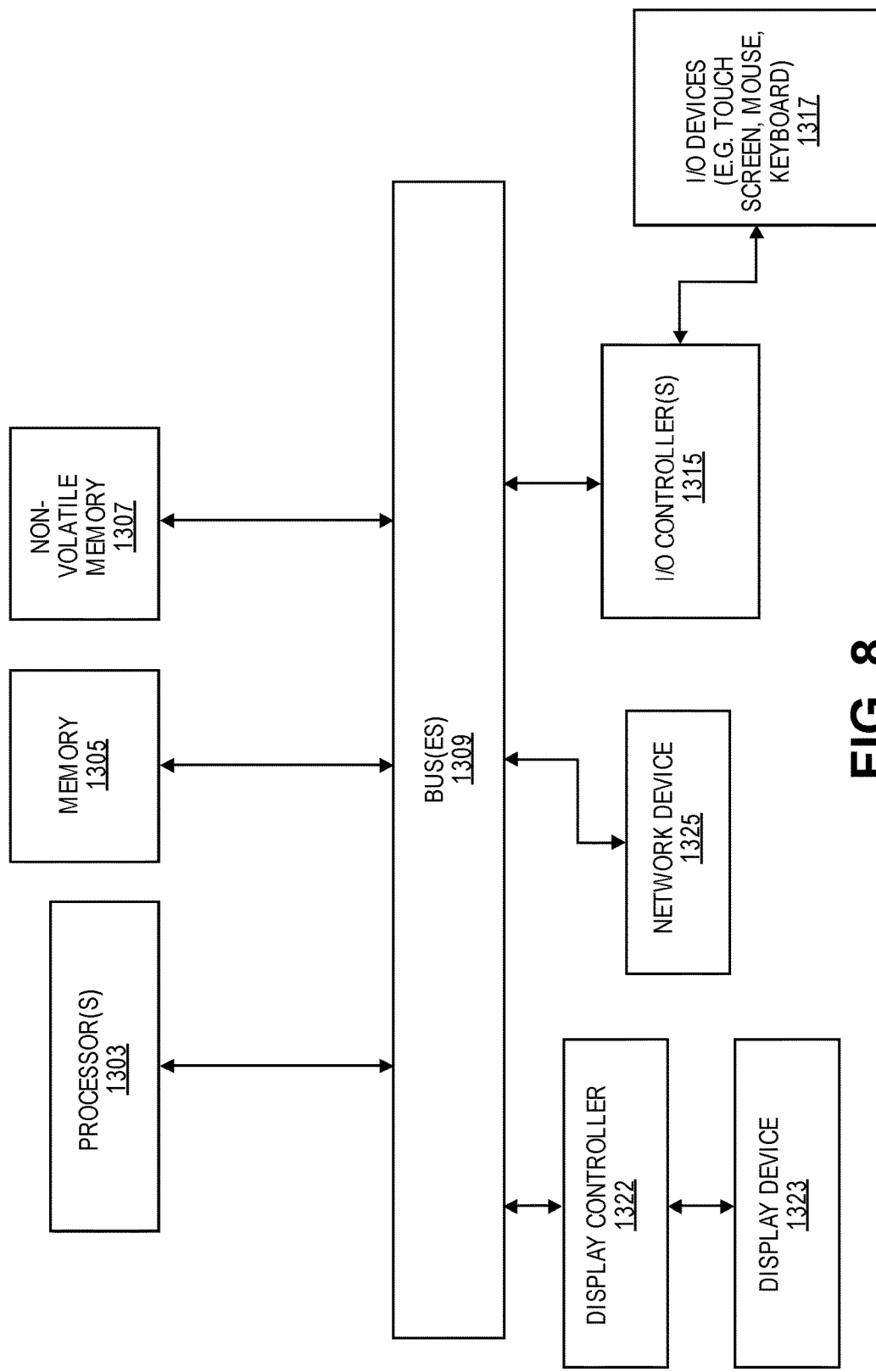
FIG. 8 shows an example of a data processing system which can be a laptop computer, etc.

FIG. 8 is a block diagram of data processing system hardware according to an embodiment. Note that while FIG. 8 illustrates the various components of a data processing system that may be incorporated into a mobile or handheld device or other electronic device, it is not intended to represent any particular architecture or manner of interconnecting the components as such details are not germane to the present invention. It will also be appreciated that other types of data processing systems that have fewer components than shown or more components than shown in FIG. 8 can also be used with the present invention.

As shown in FIG. 8, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems (e.g., ROM) that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 8 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. volatile DRAM or non-volatile flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), speaker systems with integrated computing capabilities, handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed by a data processing system cause the data processing system to perform a method comprising:

receiving a set of one or more packages comprising an operating system update which includes a first portion of the operating system (OS) update and a second portion of the OS update;

installing the first portion which provides a bootable operating system without the second portion being installed;
committing to boot off the first portion after installing the first portion;
attempting installation, after committing to boot off the first portion, of the second portion, wherein installation of the second portion is attempted in response to successful installation of the first portion and wherein after successful installation of the second portion, the first portion and the second portion are retained as a bootable OS for the data processing system.

2. The medium as in claim 1 wherein the committing to boot off the first portion requires the data processing system to boot off the first portion rather than a prior operating system and wherein the first portion provides only some of the functionality of the operating system update and the second portion provides a remainder of the functionality of the operating system update and wherein a manifest of the OS update includes both the first portion and the second portion and wherein the attempting installation is attempted automatically without user input in response to successful installation of the first portion.

3. The medium as in claim 1 wherein the method further comprises:
confirming proper installation of the first portion prior to committing to boot off the first portion; and wherein if installation of the second portion fails, the first portion operates with a second portion of a prior operating system.

4. The medium as in claim 1 wherein installing the first portion comprises installing new boot software while retaining a prior boot software to allow reversion to the prior boot software prior to a point of no return to booting off the prior boot software.

5. The medium as in claim 4 wherein installing the first portion further comprises installing new operating system software through a copy-on-write snapshot while a prior operating system software remains available for use in booting up the data processing system prior to the point of no return.

6. The medium as in claim 4 wherein the committing to boot off the first portion commits by switching a boot up parameter to indicate to boot off the new boot software rather than the prior boot software.

7. The medium as in claim 4 wherein installing the first portion further comprises installing a disk operating system (DOS) for a non-volatile memory, wherein the DOS is backward-compatible with a prior operating system software.

8. The medium as in claim 1 wherein the operating system update is installed on an embedded system that provides secure boot up for a data processing system that contains the embedded system, and wherein the embedded system includes a secure processing system and the data processing system includes a set of one or more application processors coupled to the secure processing system.

9. The medium as in claim 8 wherein the embedded system stores and verifies a boot program to boot up the data processing system, and wherein failure to install the second portion causes the data processing system to redo the update of the second portion.

10. The medium as in claim 1 wherein the second portion includes updated firmware for a set of one or more sensors, including a radio for wireless payment.

11. The medium as in claim 1 wherein the committing to boot off the first portion changes a cryptographic parameter related to a code signature so that a prior operating system will have an invalid code signature and not be allowed to boot by a secure processing system.

12. A method comprising:
receiving a set of one or more packages comprising an operating system update which includes a first portion of the operating system (OS) update and a second portion of the OS update;
installing the first portion which provides a bootable operating system without the second portion being installed;
committing to boot off the first portion after installing the first portion;
attempting installation, after committing to boot off the first portion, of the second portion, wherein installation of the second portion is attempted in response to successful installation of the first portion and wherein after successful installation of the second portion, the first portion and the second portion are retained as a bootable OS for the data processing system.

13. The method as in claim 12 wherein the committing to boot off the first portion requires the data processing system to boot off the first portion rather than a prior operating system and wherein the first portion provides only some of the functionality of the operating system update and the second portion provides a remainder of the functionality of the operating system update and wherein a manifest of the OS update includes both the first portion and the second portion and wherein the attempting installation is attempted automatically without user input in response to successful installation of the first portion.

14. The method as in claim 12 wherein the method further comprises:
confirming proper installation of the first portion prior to committing to boot off the first portion; and wherein if installation of the second portion fails, the first portion operates with a second portion of a prior operating system.

15. The method as in claim 12 wherein installing the first portion comprises installing new boot software while retaining a prior boot software to allow reversion to the prior boot software prior to a point of no return to booting off the prior boot software.

16. The method as in claim 15 wherein installing the first portion further comprises installing new operating system software through a copy-on-write snapshot while a prior operating system software remains available for use in booting up the data processing system prior to the point of no return.

17. The method as in claim 15 wherein the committing to boot off the first portion commits by switching a boot up parameter to indicate to boot off the new boot software rather than the prior boot software.

18. The method as in claim 15 wherein installing the first portion further comprises installing a disk operating system (DOS) for a non-volatile memory, wherein the DOS is backward-compatible with a prior operating system software.

19. The method as in claim 12 wherein the operating system update is installed on an embedded system that provides secure boot up for a data processing system that contains the embedded system, and wherein the embedded system includes a secure processing system and the data processing system includes a set of one or more application processors coupled to the secure processing system.

20. The method as in claim 19 wherein the embedded system stores and verifies a boot program to boot up the data processing system, and wherein failure to install the second portion causes the data processing system to redo the update of the second portion.

21. The method as in claim 12 wherein the second portion includes updated firmware for a set of one or more sensors, including a radio for wireless payment.

22. The method as in claim 12 wherein the committing to boot off the first portion changes a cryptographic parameter related to a code signature so that a prior operating system will have an invalid code signature and not be allowed to boot by a secure processing system.

* * * * *